April 7, 1936.  F. C. TORKELSON  2,036,445
ADJUSTABLE V-TYPE PULLEY
Filed Feb. 12, 1934  2 Sheets-Sheet 1
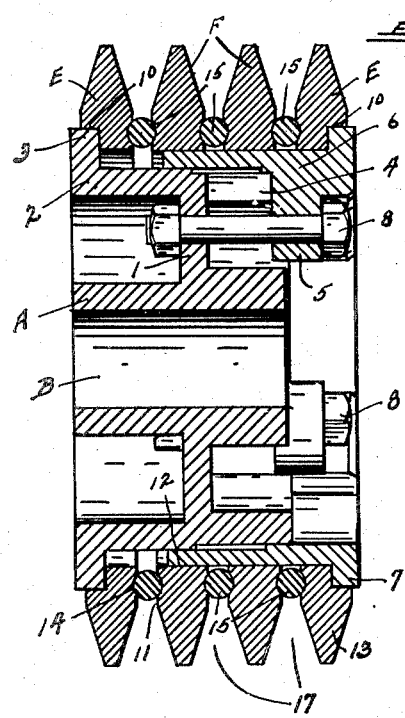
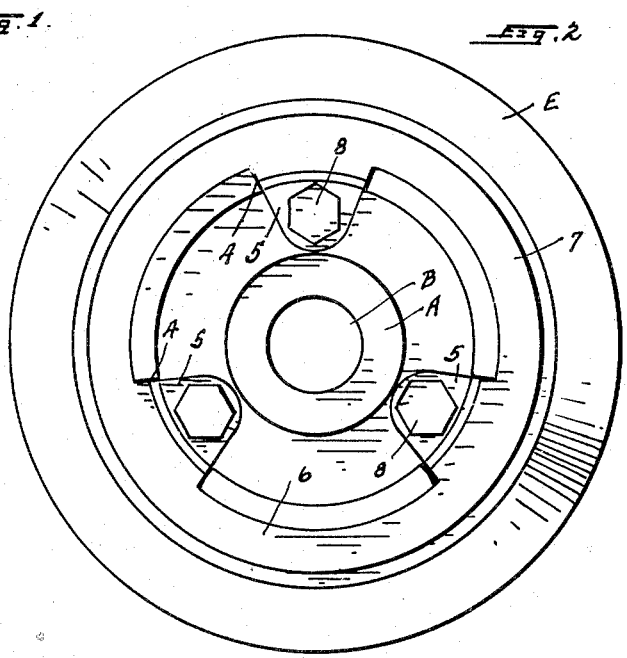
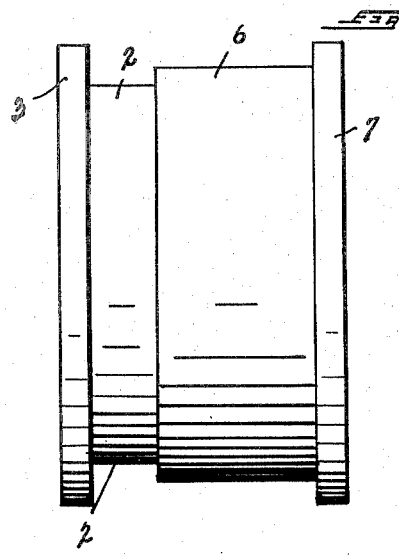
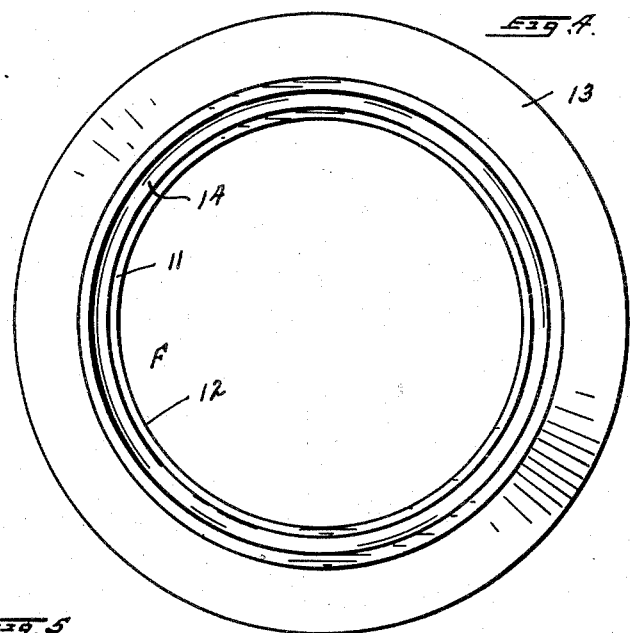
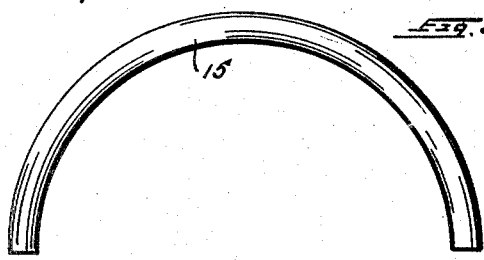
Inventor
Frank C. Torkelson
By R. M. Thomas
Attorney April 7, 1936.  F. C. TORKELSON  2,036,445
ADJUSTABLE V-TYPE PULLEY
Filed Feb. 12, 1934   2 Sheets-Sheet 2
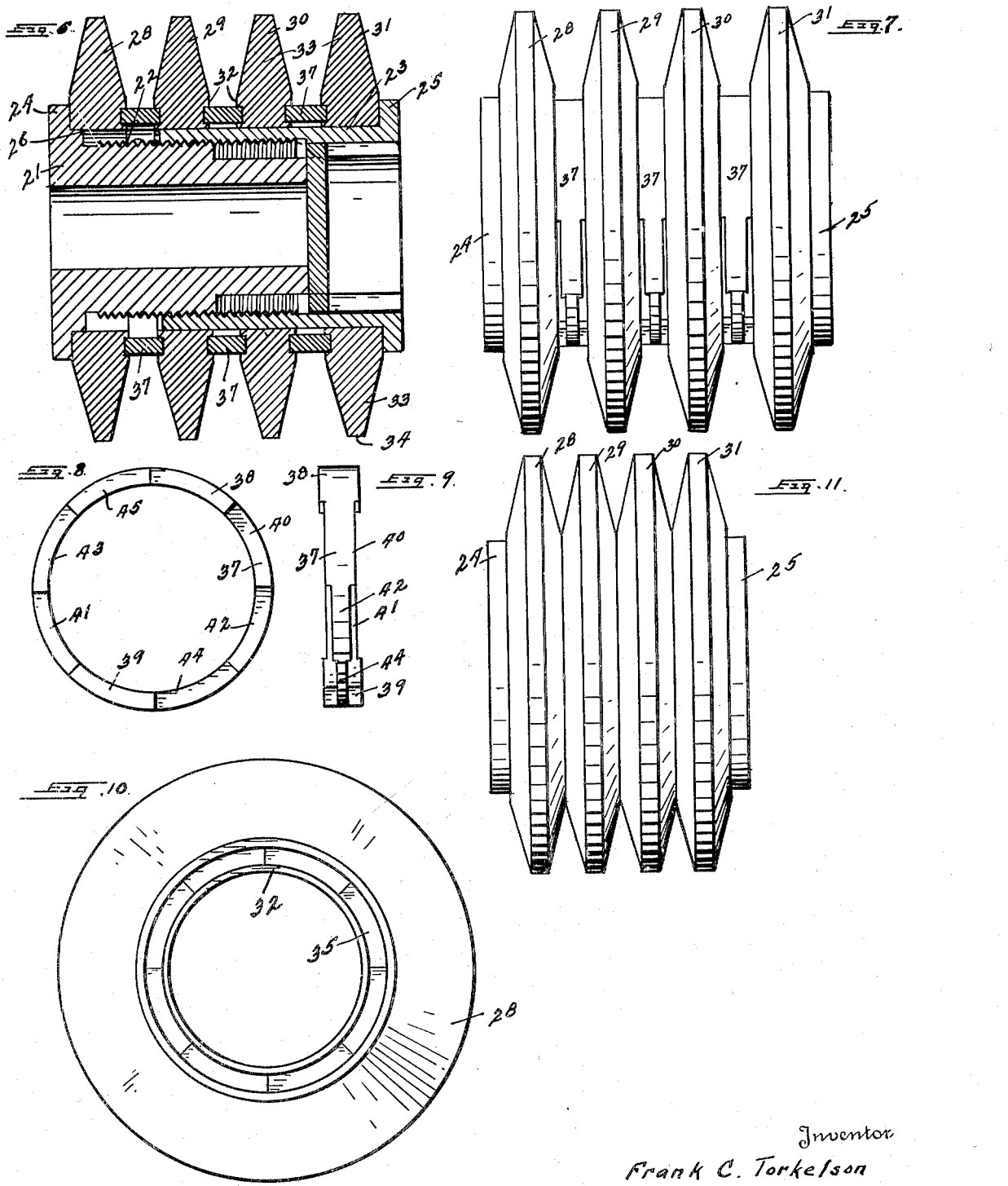
Inventor
Frank C. Torkelson
By R. M. Thomas
Attorney Patented Apr. 7, 1936

2,036,445

UNITED STATES PATENT OFFICE 2,036,445

ADJUSTABLE V-TYPE PULLEY

Frank C. Torkelson, Salt Lake City, Utah

Application February 12, 1934, Serial No. 710,833

1 Claim. (Cl. 74—230.17)

My invention relates to pulley wheels and has for its object to provide a new and efficient unit construction adjustable multiple pulley wheel.

A further object is to provide a unit construction adjustable pulley wheel which may be used to take up slack in V-type belts when they have become stretched through use.

A still further object is to provide a unit constructed adjustable pulley wheel which is adapted for use on fixed centers and which may be adjusted to the belt to take up slack in the belt without the use of exterior means.

A still further object is to provide a multiple pulley on which various sized belts may be used with equal efficiency.

These objects I accomplish with the device illustrated in the accompanying drawings in which similar numerals and letters of reference indicate like parts throughout the several views and as described in the specification forming a part of this application and pointed out in the appended claim.

In the drawings

Figure 1 is a vertical section diametrically through the pulley with metallic rings in place to show the grooves extended to the fullest limits.

Figure 2 is an end view of Figure 1.

Figure 3 is a view of the outside of the hub and sleeve with the rings removed.

Figure 4 is a face view of one of the rings to show the annular spacer ring groove therein.

Figure 5 is a face view of a section of the adjustment rings.

Figure 6 is a diametrical section of the pulley of the annular diameter type shown fully extended to either use a wide belt or to produce the smallest pitch diameter for use with a small or short belt.

Figure 7 is a side elevation of Figure 6.

Figure 8 is a face view of one of the tape up adjusting rings used in the small pulley.

Figure 9 is a side view of Figure 8.

Figure 10 is a face view of the groove rings used in the smaller pulley showing the annular groove therein and the steps in the bottom of the groove.

Figure 11 is a side elevation of the pulley wheel closed to the largest pitch diameter.

In the drawings I have shown the pulley wheel as made with cylindrical hub portion A, having a bore B therethrough in which the shaft is placed and secured by suitable means. Extending from said hub A, I then provide a web 1 having a drum 2 formed at right angles thereto and parallel to the hub A. This drum 2 has a flange 3 formed on one end thereof and has the other end provided with cut away section 4 in which sliding lugs 5 of a sleeve 6 are carried. The sleeve 6 surrounds the drum 2 with a portion thereof, and the free end of the sleeve is provided with a flange 7 thereon equal in diameter to the flange 3. Bolts 8 are passed through holes in the flange web 1 and through holes in the lugs 5 to provide means for securing the drum and sleeve together and for adjustment thereof. When the two members are secured together they form a completed drum as shown in Figure 3 of the drawings. In this view the drum is extended to encompass the rings in their greatest separation for use with the largest type of belts or for use when small type belts are used and the belt is short. This drum as shown in Figure 3 is alike in position to that shown in Figure 1 where the various rings are held thereon and spaced apart by the wire ring spacer D. Each of the outside rings E are used to make the grooves therebetween and are formed with step cuts 10 therein to fit over the flanges 3 and 6 of the sleeve and drum. The inside rings F have the side walls 11 parallel and at right angles to the bore 12. The bore 12 of all of the rings is equal to the outside diameter of the sleeve 6 to fit thereon. The inside faces of the walls of the outside rings E and both side faces of the rings F are provided with annular concave grooves 14 and different sized metallic or semi-circular wire rings 15 may be placed therein to space the rings apart as desired. Thus any type of wire may be formed into a ring and set into the annular grooves to space the rings apart. The rings E and F have the outer portions 13 thereof tapered toward the outer perimeter and when they are all set together on the sleeve and hub they form the annular grooves 17 therebetween in which the belts ride.

When no wire rings are used then, the rings E and F abut and form V-shaped grooves therebetween, and the pulley is in the narrowest position. The wire rings used in this type of device are preferably made semicircular or in segments of a circle to enable changing the pitch diameters of the pulleys without entirely dissembling the pulley. In this form the rings may be removed and inserted in sections from either side without removing the bolts 8.

In Figures 6, 7, 8, 9 and 10 of the drawings I have shown the modified form of wheel as made with a cylindrical hub portion 21 adapted to fit onto the stub shaft of a motor or other stub shafts and having external threads 22 formed on the exterior thereof onto which threads an adjusting sleeve 23 is screwed. The hub 21 and the sleeve 23 are each provided with flanges 24 and 25 respectively on the outer ends thereof and a step 26 is formed on the hub 21 adjacent the flange 24 equal in diameter to the diameter of the outer perimeter of the sleeve 23. Thus, when the sleeve and hub are screwed together they form a smooth exterior of equal diameter with the flanges on each end thereof. Surrounding this sleeve and hub I then provide the groove rings 28, 29, 30 and 31. These rings are formed with equal inner diameters to fit onto the sleeve 23 and the step 26 of the hub 21. The outer portions of the rings are tapered toward the outer perimeter and when together on the hub and sleeve form annular rings with annular grooves therebetween, the grooves being V-shaped when the rings are set touching each other as shown in Figure 10 of the drawings. The rings are made with the inner bore parallel and equal diameters and with short parallel side walls 32 extending up from the bore thereof with the tapered portions 33 extending out from the parallel side walls. In cross section, the portions 33 are tapered to a point with the apex cut away to leave a flat surface 34 therearound. The rings may be all made identical for purposes of manufacture and each side of each ring is provided with an annular groove 35 cut therein in the side walls 32 thereof. This groove is made with various depths therein each depth being adjusted to the next depth with a step vertical to the bottom of the groove. As shown in Figure 9 these grooves are made with four different depths therein. The grooves are then provided with adjustable spacer rings 37 formed annular to fit the inner and outer perimeter of the side walls of the grooves but with the faces of the rings formed identical to the bottom faces of the grooves. Each ring has preferably four different widths, the widest portions 38 and 39 to fit into the two deepest portions of the grooves. The next widest sections 40 and 41 to fit into the like sections of the grooves. The next widest sections 42 and 43 to fit in the like sections in the grooves and the thinnest sections 44 and 45 to fit in the shallowest sections of the grooves. This fitting of the rings into the grooves is the adjustable feature of this type of pulley and as described above with the like portions or sections of the rings fitting in the like depths of the grooves the pulleys are in the closed position as shown in Figure 10. The pulleys and grooves are formed with these various dimensions so that when in the closed position the narrowest sections 44 and 45 of the rings fit into the narrowest or shallowest sections of the grooves so that the space will be completely filled and likewise the other portions of the rings fit the like portions of the grooves and when extended to the fullest extent the thickest sections of the rings will fit into the smallest or shallowest grooves to space the rings as far apart as possible. In both the rings and grooves each section of like depth or like dimension is spaced diametrically opposite to each other.

Having thus described my invention I desire to secure by Letters Patent and claim:

In an adjustable pulley of the class described the combination of a hub; a web extending from said hub; a drum formed around said web having one end of said drum provided with a flange extending therearound of greater diameter than the drum; a sleeve carried over said drum havings its perimeter smaller than the flange of the drum and having its outer end provided with a flange of equal diameter to that of the flange on said drum; inwardly extended lugs formed on said sleeve; bolts passed through said lugs and through the web of said hub to adjustably hold the sleeve and drum in fixed relation to each other; annular ring members, frusto-conical in cross section, carried on said sleeve and drum the outer of said members to fit against said flanges and the adjacent edges of all ring members formed with annular grooves therein; and half circular spacer members to be placed in said annular grooves to space the ring apart as desired, said spacer members to be removable by loosening the bolts sufficient to allow them freedom from said annular grooves to be replaced by other sized spacer members when desired to adjust said pulley.

FRANK C. TORKELSON.